(12) United States Patent
Kikuchi

(10) Patent No.: US 12,422,589 B2
(45) Date of Patent: Sep. 23, 2025

(54) PROGRAM PRODUCT FOR CREATING WEATHER PREDICTION DATA, A METHOD FOR CREATING WEATHER PREDICTION DATA, AND A MOVING VEHICLE

(71) Applicant: DoerResearch, Inc., Chiba (JP)

(72) Inventor: Ryota Kikuchi, Chiba (JP)

(73) Assignee: DOERRESEARCH, INC., Chiba (JP)

(*) Notice: Subject to any disclaimer, the term of this patent is extended or adjusted under 35 U.S.C. 154(b) by 0 days.

(21) Appl. No.: 17/603,718

(22) PCT Filed: Apr. 11, 2020

(86) PCT No.: PCT/JP2020/016226
§ 371 (c)(1),
(2) Date: Oct. 14, 2021

(87) PCT Pub. No.: WO2020/213547
PCT Pub. Date: Oct. 22, 2020

(65) Prior Publication Data
US 2022/0196878 A1    Jun. 23, 2022

(30) Foreign Application Priority Data
Apr. 15, 2019 (JP) .................. 2019-077099

(51) Int. Cl.
*G01W 1/10* (2006.01)

(52) U.S. Cl.
CPC .................... *G01W 1/10* (2013.01)

(58) Field of Classification Search
CPC ...................................... G01W 1/10
See application file for complete search history.

(56) References Cited

U.S. PATENT DOCUMENTS

| | | | |
|---|---|---|---|
| 6,535,817 B1* | 3/2003 | Krishnamurti | G01W 1/10 |
| | | | 702/3 |
| 7,529,623 B2 | 5/2009 | Tanahashi | |
| 8,204,846 B1 | 6/2012 | Crawford et al. | |
| 10,866,341 B2 | 12/2020 | Kakimoto et al. | |
| 2007/0244644 A1 | 10/2007 | Tanahashi | |
| 2008/0255714 A1 | 10/2008 | Ross | |

(Continued)

FOREIGN PATENT DOCUMENTS

| CN | 108629452 A | 10/2018 |
|---|---|---|
| JP | 2007285773 A | 11/2007 |

(Continued)

OTHER PUBLICATIONS

International Search Report with English Translation issued in corresponding International Application No. PCT/JP/2020/016226 date of mailing Jul. 14, 2020 (5 pages).

(Continued)

*Primary Examiner* — Yoshihisa Ishizuka
(74) *Attorney, Agent, or Firm* — FLYNN THIEL, P.C.

(57) ABSTRACT

A program product for creating weather prediction data and a method for creating weather prediction data, which are available for a moving vehicle with high-speed. The computer program product executes the steps of recording ensemble weather forecasting data, recording observed weather data, recording weight data, and creating weather prediction data by using the weight data and the ensemble weather forecasting data.

3 Claims, 4 Drawing Sheets

(56) References Cited

U.S. PATENT DOCUMENTS

| | | | | |
|---|---|---|---|---|
| 2015/0379408 A1* | 12/2015 | Kapoor | ............... | G01W 1/10 |
| | | | | 706/46 |
| 2016/0299255 A1* | 10/2016 | Dail | ................. | G01W 1/10 |
| 2016/0356922 A1 | 12/2016 | Mccann et al. | | |
| 2019/0271563 A1* | 9/2019 | Pandit | ............... | G01W 1/10 |
| 2020/0311149 A1* | 10/2020 | Karmelich | ........ | G08G 5/0095 |

FOREIGN PATENT DOCUMENTS

| | | | | |
|---|---|---|---|---|
| JP | 201753804 A | 3/2017 | | |
| WO | WO-0002064 A1 * | 1/2000 | ............ | G01S 13/87 |
| WO | 2019004416 A1 | 1/2019 | | |

OTHER PUBLICATIONS

Written Opinion of International Searching Authority issued in corresponding International Application No. PCT/JP2020/016226dated Jul. 14, 2020 (3 pages).

Saito, Kazuo et al., Nonhydrostatic Atmospheric Models and Operational Development at JMA, Journal of the Meteorologial Society of Japan, vol. 85B, pp. 271-304, 2007 (34 pages).

Evensen G, Abstract of Sequential data assimilation with a nonlinear quasi-geostrophic model using Monte Carlo methods to forecast error statistics, Journal of Geophysical Research: Oceans, vol. 99, Issue C5, 1994 (1 page).

Chinese Office Action with English translation issued in corresponding Chinese Application No. 202080021814.7 dated Nov. 10, 2022 (15 pages).

Extended European Search Report issued in corresponding European Application No. 20791221.3, dated Nov. 25, 2022 (9 pages).

Communication from the European Patent Office issued in corresponding European Application No. 20 791 221.3, dated Jun. 5, 2025 (6 pages).

* cited by examiner

【Fig. 1】
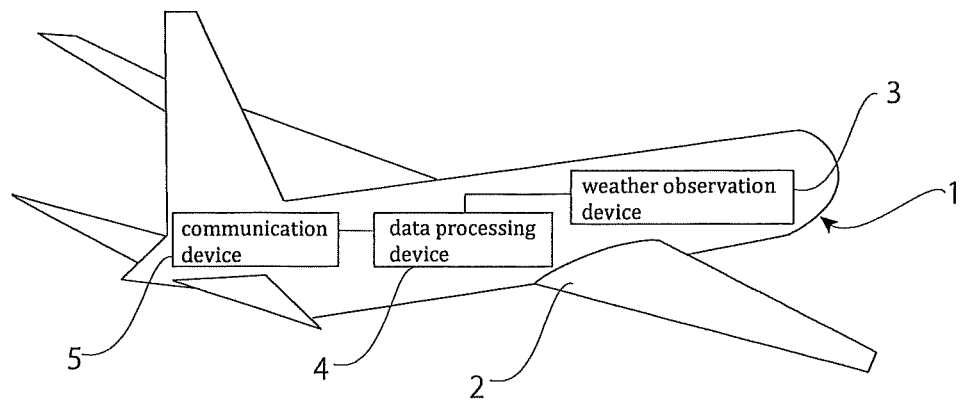
【Fig. 2】
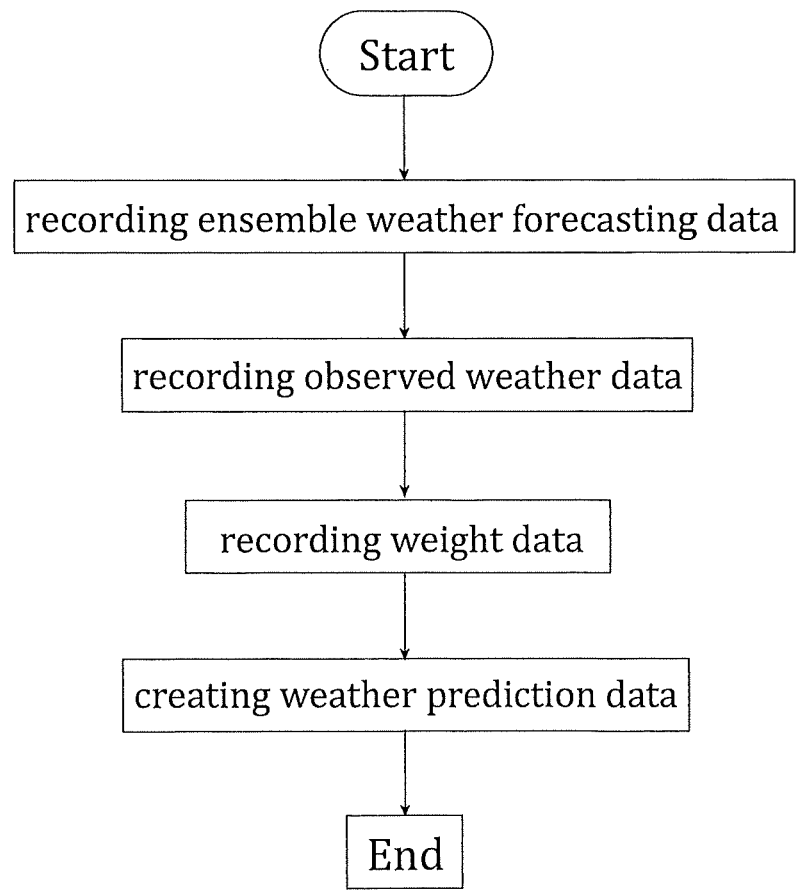

[Fig. 3]
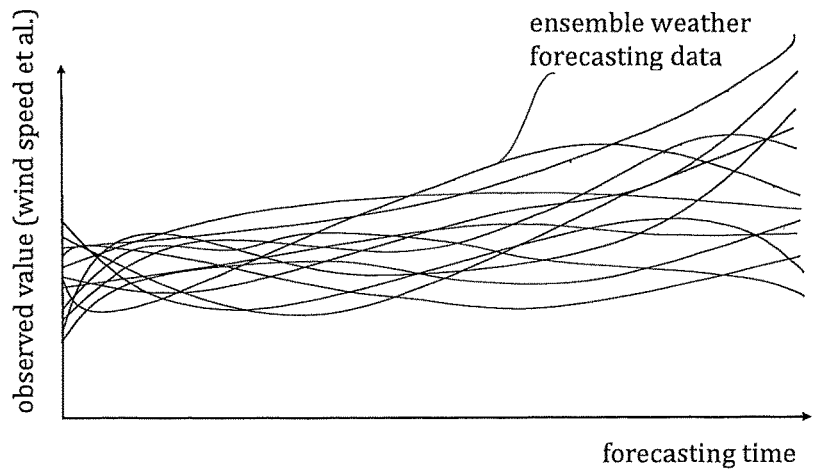
[Fig. 4]
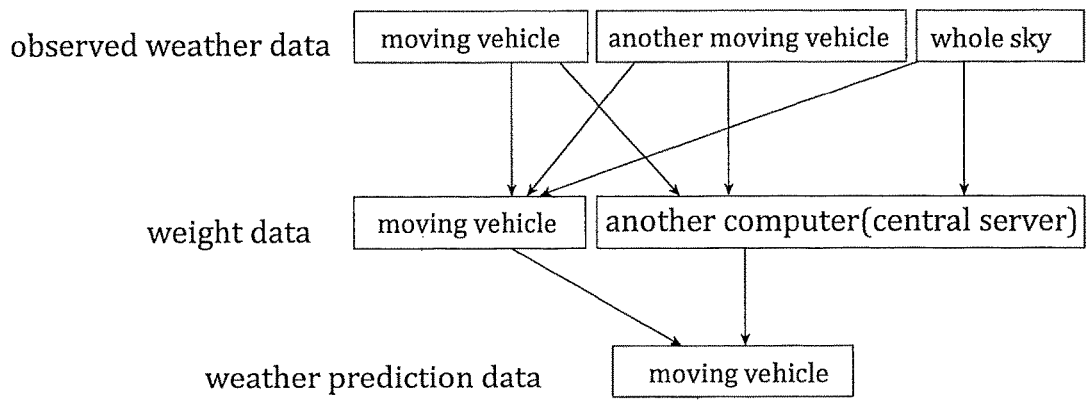
[Fig. 5]
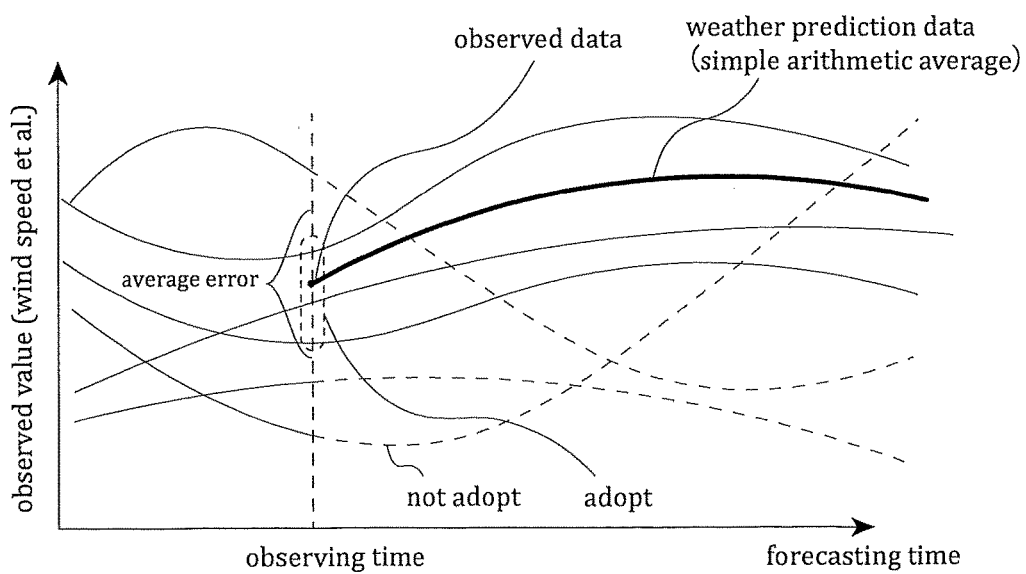

[Fig. 6]
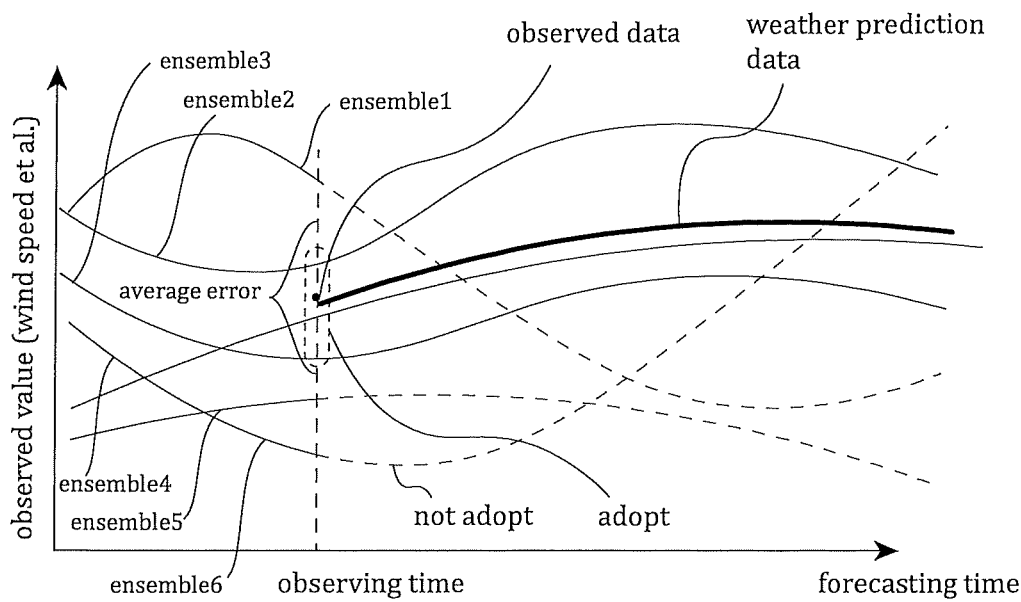
| | absolute error | judgement | weight |
|---|---|---|---|
| ensemble1 | 10 | above average | 0 |
| ensemble2 | 3 | below average | $\frac{1/3}{1/3+1/1+1/4}$ |
| ensemble3 | 1 | below average | $\frac{1/1}{1/3+1/1+1/4}$ |
| ensemble4 | 4 | below average | $\frac{1/4}{1/3+1/1+1/4}$ |
| ensemble5 | 10 | above average | 0 |
| ensemble6 | 15 | above average | 0 |
(average 7.2)

[Fig. 7]
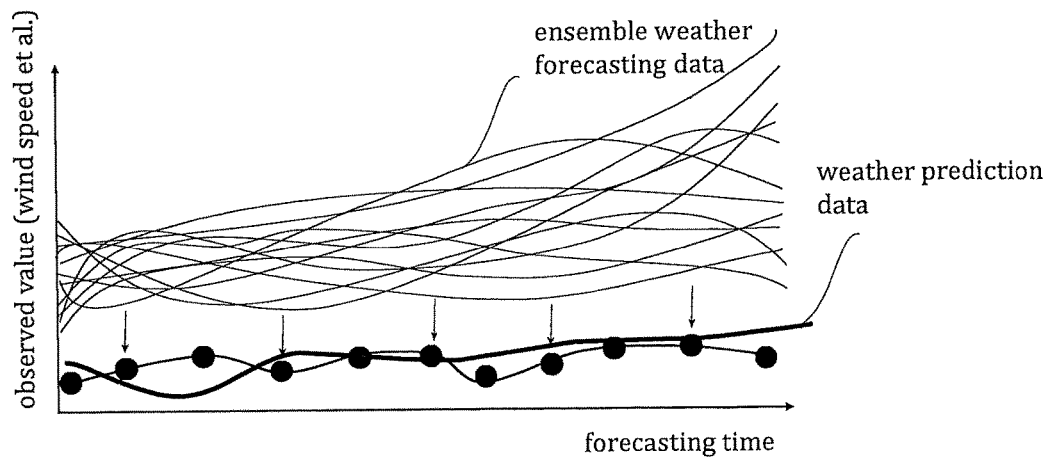
[Fig. 8]
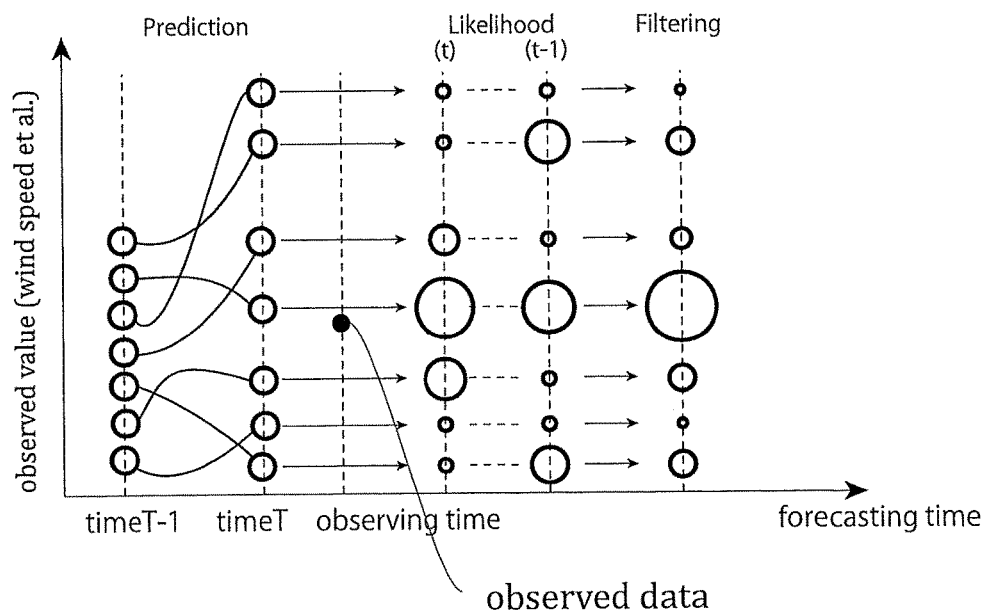

PROGRAM PRODUCT FOR CREATING WEATHER PREDICTION DATA, A METHOD FOR CREATING WEATHER PREDICTION DATA, AND A MOVING VEHICLE

TECHNICAL FIELD

The present invention is related to a program for creating weather prediction data, a method for creating weather prediction data, and a moving vehicle.

RELATED ART

With the development of aircraft, watercraft, and transportation systems, it is presently possible to travel a long distance.

Incidentally, in long-distance travel, it is possible to manage the arrival time accurately by obtaining accurate weather information of the transit points.

For example, in the case that the means for transportation is an aircraft, by grasping the weather information which includes atmospheric turbulence at the transit points, it is possible to not only keep the arrival time accurately but also to travel more safely.

For example, the technology for getting weather information accurately is described in NON-PATENT DOCUMENT 1 and NON-PATENT DOCUMENT 2.

For example, NON-PATENT DOCUMENT 1 discloses a technology that creates new weather forecasts at several hours intervals by using data assimilation which combines observation and forecast models. It is a general weather forecasting method.

Moreover, NON-PATENT DOCUMENT 2 discloses a technology for creating several ensemble data for expressing the uncertainty of weather forecasting. The ensemble data includes future information at a certain point in time.

It is a useful weather forecasting method for obtaining weather information that is difficult to predict such as a typhoon.

REFERENCE FOR RELATED ART

Non-Patent Document

[Non-Patent Document1]
Saito et.al., (2007), "Nonhydrostatic atmospheric models and operational development", JMA. J. Soc. Jpn., 85B, 271-304
[Non-Patent Document2]
Evensen G, (1994), "Sequential data assimilation with a nonlinear quasigeostrophic model using Monte Carlo methods to forecast error statics", J. Geophys. Res., 99, 10143-10162

DESCRIPTION OF THE INVENTION

Solution to the Problems

However, in the technology which is described in the above-described DOCUMENT 1, it is necessary to process a large amount of data. Furthermore, a long time interval for prediction is needed even if a supercomputer at the present state of the art is used.

Moreover, even with the technology described in the above-described NON-PATENT DOCUMENT 2, there is a problem such that it is necessary to receive a new ensemble data repeatedly over time, and process a large quantity of data in a short time.

Moreover, the transmitted and received data volume is limited on a moving vehicle, and even if intended to process the data on the moving vehicle, the weight of the data processing device which will be mounted to the moving vehicle is also limited.

Thus, in consideration of the above-described problems, one of the objects of the present invention is to provide a program product and a method for creating weather prediction data in a moving vehicle that can move at high speed. Furthermore, another object of the present invention is to provide a moving vehicle that can create weather prediction data.

Means for Solving the Problems

In examining the above-described problem, the inventor of the present invention found that it is possible to reduce the data processing volume and the transmitted and received data volume by using weight data in a combination of ensemble weather forecasting data and the observed weather data. Then, the inventor accomplished the present invention.

Thus, one aspect of the present invention is a computer program product that executes the steps of (a) recording ensemble weather forecasting data, (b) recording observed weather data, (c) recording weight data, and (d) creating weather prediction data by using the weight data and the ensemble weather forecasting data.

Furthermore, another aspect of the present invention is a method for creating weather prediction data. The method comprises steps of (a) recording ensemble weather forecasting data, (b) recording observed weather data, (c) recording weight data, and (d) creating weather prediction data by using the weight data and the ensemble weather forecasting data.

Furthermore, another aspect of the present invention is a moving vehicle which comprises a moving device, and a weather observation device, and a data processing device that are mounted on the moving device. Moreover, the data processing device comprises a recording medium, and the recording medium records a weather prediction data creating program which executes the steps of (a) recording ensemble weather forecasting data, (b) recording observed weather data, (c) recording weight data, and (d) creating weather prediction data by using the weight data and the ensemble weather forecasting data.

Effects of the Invention

Thus, by the present invention, it is possible to provide a program product and a method for creating weather prediction data in a moving vehicle that can move at high speed. Furthermore, by the present invention, it is possible to provide a moving vehicle that can create weather prediction data.

BRIEF DESCRIPTION OF THE DRAWINGS

FIG. 1 shows an outline of a moving vehicle of an embodiment of the present invention.

FIG. 2 shows a flow diagram of a method of creating weather prediction data of an embodiment of the present invention.

FIG. 3 shows an example of the ensemble weather forecasting data of an embodiment of the present invention.

FIG. 4 shows an example of the variation of creation of the weather prediction data of an embodiment of the present invention.

FIG. 5 shows an example of the method of obtaining the ensemble average of an embodiment of the present invention.

FIG. 6 shows an example of the method of obtaining the ensemble average of an embodiment of the present invention.

FIG. 7 shows an example of the method of obtaining the ensemble average of an embodiment of the present invention.

FIG. 8 shows an example of the method of obtaining the ensemble average of an embodiment of the present invention.

BEST MODE FOR CARRYING OUT THE PRESENT INVENTION

Hereinafter, the embodiments of the present invention are described by referring to the drawings. However, the present invention can be carried out with various embodiments and is not limited to only specific examples that are shown in embodiments and experiments described below.

FIG. 1 shows an outline of a moving vehicle 1 of this embodiment (Hereafter "the moving vehicle").

As shown in FIG. 1, the moving vehicle 1 comprises a moving device 2, a weather observation device 3, a data processing device 4, and a communication device 5. The moving device 2, the weather observation device 3, the data processing device 4, and the communication device 5 are mounted on the moving vehicle 1.

The moving vehicle 1 is a vehicle that can travel comprising the above-described components, and it includes, for example, a flight vehicle, an automobile, and a vessel et al. but it is not limited to them as long as it can travel.

In a case of a flight vehicle, as shown in FIG. 1, it includes such as a plane, a helicopter, and a drone (Unmanned Aerial Vehicle).

In a case of an automobile, it includes a car.

Furthermore, moving vehicle 1 comprises the moving device 2 as described above. The moving device 2 comprises general equipment required for enabling moving. For example, it is desirable that the moving device 2 includes an airframe for loading required devices and forming a basic skeleton of the moving vehicle, a power source such as an engine loaded on the airframe, chairs for which passengers sit, and so on. It is possible to adopt existing known structure for them.

Furthermore, the moving vehicle 1 comprises a weather observation device 3.

By that, it is possible to predict the weather at the point during traveling. The observation result will be output as observed weather data.

In the weather observation device 3, it is not limited as long as it can predict weather. For example, it is desirable that the weather observation device includes a thermometer for measuring the temperature, an atmospheric pressure sensor for measuring the atmospheric pressure, a hydrometer for measuring for measuring air humidity, an anemoscope for measuring the wind direction, an anemometer for measuring the wind speed, an altimeter for measuring the flight altitude, and a position information measuring device for measuring the position.

Furthermore, moving vehicle 1 comprises a data processing device 4.

As described above, the data processing device 4 can receive and record ensemble weather forecasting data, observed weather data, and weight data, and create weather prediction data by the specified process.

Furthermore, it is desirable that the composition of the data processing device 4 is a so-called computer, but it is not limited to it as long as it can perform the above-described function.

In the case of a computer, it can be a general computer available on the market.

For example, it is desirable that the computer comprises a central processing unit (CPU), a recording medium such as a RAM and a hard disk, a keyboard (including a virtual keyboard which is displayed on a display device), a display device such as a liquid crystal display, and wiring line for connecting them to each other (such as a bus line).

Of course, the computer includes small-sized computers such as a so-called smartphone, and a tablet.

Moreover, in the case that the data processing device 4 adopts the above-described composition, the specific process can be executed according to the user's request by recording the computer program, which executes the specific process, on the above-described recording medium.

More concretely, it is possible to create weather prediction data by reading the computer program, which is recorded on the recording medium such as a hard disk, on RAM temporarily, and running it for processing the specific process.

Here, the required process of this embodiment can work various ways; however, it at least includes the steps of (a) recording ensemble weather forecasting data, (b) recording observed weather data, (c) recording weight data, and (d) creating weather prediction data by using the weight data and the ensemble weather forecasting data.

Incidentally, by this embodiment, a method of creating weather prediction data can be provided which includes the above-described steps, and a program product for executing it for the computer.

Hereafter, the detail of the specific processing flow which is realized by the data processing device 4 will be described. This method comprises many steps which are described above. FIG. 2 shows the steps of this method.

As described above, the method comprises the steps of (S1) recording ensemble weather forecasting data, (S2) recording observed weather data which is obtained by the weather observation device, (S3) recording weight data, and (4) creating weather prediction data which is calculated based on weight data and ensemble weather forecasting data.

First, this method comprises the step (S1) recording ensemble weather forecasting data. Here, "ensemble weather forecasting data" means the data that contains many weather forecasting data which includes many predicted values in the future from a specific point of time.

It is desirable that the ensemble weather forecasting data include the data which are provided by the Meteorological Agency of Japan or other countries (US, UK, ECMWF, CMA, et al.), the data which is probabilistically created based on past ensemble weather forecasting data, or the data which is combined from the above-described two sets of data.

Furthermore, the ensemble weather forecasting data provided by the Meteorological Agency of Japan et al can be past or new.

If the scale of the ensemble weather forecasting data is not fit, it is desirable that the scale of the ensemble weather of forecasting data is adjusted, or a specific region is extracted.

FIG. 3 shows the image of the ensemble weather forecasting data.

It is desirable that the ensemble weather forecasting data is recorded on the specific region of the recording medium of the data processing device 4, in advance.

Incidentally, as described above, the data processing device 4 is connected to the communication device 5 for enabling transmitting and receiving data between internal devices or external devices, as shown in the above-described conceptual scheme of the moving vehicle.

By including the communication device 5, it is possible to obtain ensemble weather forecasting data preliminarily prepared, and observed weather data and weight data from outside.

Moreover, this method includes step (S2) recording observed weather data which is obtained by weather observation devices.

More concretely, while on the travel, the weather observation device 3 measures weather conditions at the time and the place, and outputs it to the data processing device 4. Then, the observed weather data (actual data) is recorded to a recording medium of the data processing device 4.

As described above, observed weather data includes the information of weather which is actually observed. For example, it includes measured day and time data, air pressure data, humidity data, wind direction data, wind speed data, and position data which includes altimeter data, latitude data, and longitude data.

Furthermore, this method includes step (S3) recording weight data.

Here, "weight data" is the data which contains the weight information of which weather forecasting data of the above-described ensemble weather forecasting data is important.

By considering weighting in ensemble weather forecasting, it is possible to obtain weather prediction data easily according to the actual condition without creating weather forecasting data from the beginning again.

Especially, in this method, by using "weight data", it is possible to reduce the amount of data itself. Further, it has less restriction in communication rate and capability when the moving vehicle tries transmitting and receiving information with the external devices by the communication device in traveling as described below.

Here, it is desirable that weight data is obtained by calculation based on the above-described ensemble weather forecasting data and the observed weather data, but it is not limited to it.

As the ensemble weather forecasting data includes many weather forecasting data which includes the information of change in the future from the specific point of time, if observed weather data at the point in time in the future exists, it is possible to obtain weather prediction data with high reliability after the point in time.

Here, the weight data may be obtained by the process performed by the data processing device 4 of the moving vehicle 1, or by receiving the data, which is created by outer computers, from such outer computers by communication by the communication device 5.

As the volume of the observed weather data is not big, the load of the output is not heavy even if the observed weather data is transmitted outside. Further, it is possible to receive the weight data from outside with less limitation.

On the other hand, since it is comparatively complicated to create the weight data, it is desirable to use an outer high-performance computer for more advanced and accurate processing.

Especially, by the outer computer processing, it is possible for the outer computer to obtain the observed weather data from another moving vehicle, to obtain real-time and whole-sky observed weather data, and further to create more accurate weight data based on it.

Of course, in the case of processing by the moving vehicle 1 itself, it is possible to create the weight data by exchanging the observed weather data with another moving vehicle via the communication device.

An example of the variation is shown in FIG. 4.

Incidentally, the above-described weight data can be calculated by various methods and they are not limited. For example, (S3-1) method using elite selection, (S3-2) method using error, or (S3-3) method using probability distribution can be adopted.

The detail of the above methods will be described below.
(Common Concept)

Incidentally, in each above-described method, it is desirable to obtain and use ensemble average $E(x,t)$, generally.

The ensemble average can be obtained by any method, but it is desirable that it is obtained by using the formula described below.

$$E(x, t) = \sum_{i=1}^{N} w^{(i)} e^{(i)}_{(x,t)} \qquad \text{[formula 1]}$$

$x$: coordinate $t$: time $w$: each weight data $e$: each ensemble weather forecasting data (S3-1) Method Using Elite Selection In this method, an ensemble average can be obtained by selecting the weather forecasting data which has the smallest error in the ensemble weather forecasting data.

In this case, the weight of the weather forecasting data of the smallest error is 1 and otherwise 0. So, the nearest weather forecasting data becomes the ensemble average and weather prediction data. In this case, it is desirable that the total value of weight data is 1.

(S3-2) Method Using Error

In this method, an ensemble average can be obtained by calculating the error between ensemble weather forecasting data and observed weather data.

It is possible to achieve weather forecasting data in a state close to reality by considering the contribution in proportion to the error between observed weather data and ensemble weather forecasting data.

Furthermore, the method can be classified in some patterns. The main patterns will be described below. Moreover, in this case, it is desirable that the total value of weight data is 1.

(S3-2-1:Pattern A)

In this pattern, each difference between the observed weather data and each weather forecasting data of ensemble weather forecasting data is calculated, and only weather forecasting data whose difference is less than the average of difference can be adopted.

By that, it is possible to weigh the data without adopting weather forecasting data with low quality against the average of the difference. In this case, it is typically desirable that each of the distribution values is the same. FIG. 5 shows the image of the case. Furthermore, in this case, it is desirable that the total value of weight data is 1.

(S3-2-2:Pattern B)

This pattern and the above-described pattern A are the same in the point that each difference between the observed weather data and each weather forecasting data of ensemble weather forecasting data is calculated and only weather forecasting data whose difference is less than the average of difference can be adopted.

This pattern is different from the above-described pattern A in that an inverse number of the difference for weather forecasting data is adopted.

By that, the distribution of weather forecasting data of ensemble weather forecasting data which is close to the data which is measured becomes bigger, and the distribution of weather forecasting data which is far from the data which is measured becomes smaller. As a result, it is conceivable that the data will be close to reality. FIG. 6 shows the image of the case. Furthermore, in this case, it is desirable that the total value of weight data is 1.

(S3-2-3:Pattern C)

This pattern uses the difference, but it is slightly different from the above-described patterns A and B.

The above-described patterns are desirable to adopt in the case that the weather forecasting data and the observed weather data are close and with high reliability.

However, this pattern is desirable to adopt in the case that the difference between the weather forecasting data and the observed weather data is big. In this pattern, the limitation of the weight data will be relaxed and the weather prediction data is calculated.

For example, In the above-described two patterns, it is desirable that the total value of weight data is 1, and each of the weight data is 0 or more. But, in this pattern, the total value of weight data is not limited to 1, and further, the value of the weight data can be negative.

By that, it is possible to create available weather prediction data even if the realistic solution cannot be obtained by the above-described patterns A and B.

The pattern will be shown FIG. 7.

(S3-3) Method Using the Probability Distribution

In this pattern, by assuming that the spread of the ensemble weather forecasting data is considered as probability distribution, the probability distribution is updated by using Bayes' theorem and observed weather data. FIG. 8 shows the image of the case.

By the above-described methods, it is possible to create the weight data. Of course, one may adopt one of the methods as described above. Furthermore, it is possible to adopt a method which is not described above.

Furthermore, this method comprises the step of (S4) creating weather prediction data which is calculated based on weight data and ensemble weather forecasting data.

More concretely, the weather prediction data can be obtained by summing up the value that each of the above-described weight data is multiplied by each of the weather forecasting data of ensemble weather forecasting data.

By that, the weather prediction data can be accurate at the time. The correlation between the weight data and ensemble weather forecasting data is described above.

Thus, by the embodiment of the present invention, it is possible to provide a program product and a method for creating weather prediction data on a moving vehicle that travels at high speed. Furthermore, it also provides a moving vehicle that can create weather prediction data.

INDUSTRIAL APPLICABILITY

The present invention has industrial applicability as a program product of creating weather prediction data, a method of creating weather prediction data, or a moving vehicle that can create weather prediction data.

What is claimed is:

1. A method for creating weather prediction data on a plane, comprising steps of:
providing a non-transitory computer readable medium containing computer instructions stored therein;
recording ensemble weather forecasting data which comprises a plurality of weather forecasting data on said non-transitory computer readable medium before flight;
recording real-time observed weather data which is obtained by a weather observation device on said plane on said non-transitory computer readable medium during flight;
sending said real-time observed weather data to a second computer during flight;
making said second computer calculate weight data based on said ensemble weather forecasting data and said real-time observed weather data while said plane is flying, wherein said weight data is weighted so that each of said weather forecasting data to be used has a different contribution;
recording said weight data which is received from said second computer during flight; and
creating weather prediction data based on said weight data and said ensemble weather forecasting data comprising an ensemble average calculated by each of said weather forecasting data and each of said weight data according to Formula 1 during flight:

$$E(x, t) = \sum_{i=1}^{N} w^{(i)} e_{(x,t)}^{(i)} \qquad \text{[Formula 1]}$$

x:coordinate  t:time  w:each weight data e:each ensemble weather forecasting data by performing said computer instructions stored on said non-transitory computer readable medium.

2. A plane comprising:
an air frame,
a weather observation device and a first data processing device which are mounted on said air frame, wherein said first data processing device comprises a non-transitory computer readable medium, and
said non-transitory computer readable medium is configured to record a weather prediction data creating program which is configured to execute the steps of:
recording ensemble weather forecasting data which comprises a plurality of weather forecasting data on said non-transitory computer readable medium before flight;
recording real-time observed weather data which is obtained by a weather observation device on said plane on said non-transitory computer readable medium during flight;
sending said real-time observed weather data to a second computer during flight;
making said second computer calculate weight data based on said ensemble weather forecasting data and said real-time observed weather data while said plane is flying, wherein said weight data is weighted so that each of said weather forecasting data to be used has a different contribution;
recording said weight data which is received from said second computer during flight; and creating weather prediction data based on said weight data and said ensemble weather forecasting data comprising an ensemble average calculated by each of said weather forecasting data and each of said weight data according to Formula 1 during flight:

$$E(x, t) = \sum_{i=1}^{N} w^{(l)} e^{(l)}_{(x,t)}$$ [Formula 1]

x:coordinate  t:time  w:each weight data e:each ensemble weather forecasting data by performing said computer instructions stored on said non-transitory computer readable medium.

3. A non-transitory computer readable medium of a plane, which is configured to have a weather prediction data creating program configured to execute the steps of:
recording ensemble weather forecasting data which comprises a plurality of weather forecasting data on said non-transitory computer readable medium before flight;
recording real-time observed weather data which is obtained by a weather observation device on said plane on said non-transitory computer readable medium during flight;
sending said real-time observed weather data to a second computer during flight;
making said second computer calculate weight data based on said ensemble weather forecasting data and said real-time observed weather data while said plane is flying, wherein said weight data is weighted so that each of said weather forecasting data to be used has a different contribution;
recording said weight data which is received from said second computer during flight; and
creating weather prediction data based on said weight data and said ensemble weather forecasting data comprising an ensemble average calculated by each of said weather forecasting data and each of said weight data according to Formula 1 during flight:

$$E(x, t) = \sum_{i=1}^{N} w^{(l)} e^{(l)}_{(x,t)}$$ [Formula 1]

x:coordinate  t:time  w:each weight data e:each ensemble weather forecasting data by performing said computer instructions stored on said non-transitory computer readable medium.

\* \* \* \* \*